United States Patent
Li et al.

(10) Patent No.: US 7,989,993 B1
(45) Date of Patent: Aug. 2, 2011

(54) MAGNET YOKE OF LINEAR MOTOR

(75) Inventors: Chi-Lu Li, Taichung (TW); Hsiang-Ju Wang, Taichung (TW); Bo-Sheng Huang, Taichung (TW)

(73) Assignee: Hiwin Mikrosystem Corp., Nantun District, Taichung (TW)

( * ) Notice: Subject to any disclaimer, the term of this patent is extended or adjusted under 35 U.S.C. 154(b) by 0 days.

(21) Appl. No.: 12/661,019

(22) Filed: Mar. 9, 2010

(51) Int. Cl.
   *H02K 41/02* (2006.01)

(52) U.S. Cl. ............ 310/12.24; 310/12.25; 310/12.26; 310/12.33

(58) Field of Classification Search .... 310/12.01–12.33, 310/266, 268, 154, 156; *H02K 41/02, 41/03*
See application file for complete search history.

(56) References Cited

U.S. PATENT DOCUMENTS

| | | | |
|---|---|---|---|
| 6,455,957 B1 * | 9/2002 | Chitayat | 310/12.19 |
| 6,798,089 B1 * | 9/2004 | Smit | 310/12.26 |
| 6,803,682 B1 * | 10/2004 | Thirunarayan et al. | 310/12.24 |
| 6,919,653 B2 * | 7/2005 | Thirunarayan et al. | 310/12.24 |
| 7,145,271 B2 * | 12/2006 | Thirunarayan et al. | 310/12.01 |
| 7,456,528 B2 * | 11/2008 | Thirunarayan-Kumar et al. | 310/12.25 |
| 7,586,217 B1 * | 9/2009 | Smith et al. | 310/12.25 |
| 7,595,571 B2 * | 9/2009 | Thirunarayan-Kumar et al. | 310/12.25 |
| 2009/0072633 A1 * | 3/2009 | Thirunarayan et al. | 310/12 |
| 2009/0322162 A1 * | 12/2009 | Jajtic et al. | 310/12.24 |

* cited by examiner

*Primary Examiner* — Quyen Leung
*Assistant Examiner* — Thomas Truong
(74) *Attorney, Agent, or Firm* — Charles E. Baxley

(57) ABSTRACT

A magnet yoke of a linear motor includes a plurality of recesses set in equidistance in a side surface of the magnet yoke and defining a plurality of peaks and valleys arranged alternately and a plurality of permanent magnets aligned abreast in equidistance in an opposite side surface of the magnet yoke so that an interval is defined between two adjacent permanent magnets and has a center aligned with a center of a corresponding peak and valley. Two adjacent permanent magnets form a magnet unit for generating a magnetic flux distribution. An empty section formed in each of the valleys is twice as wide as an interval between two adjacent permanent magnets, and is located in a middle of the two permanent magnets so as to make a moderate magnetic flux distribution.

8 Claims, 3 Drawing Sheets

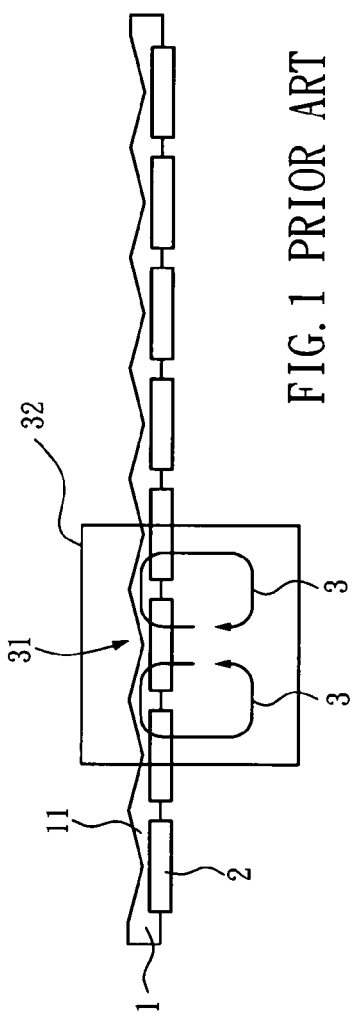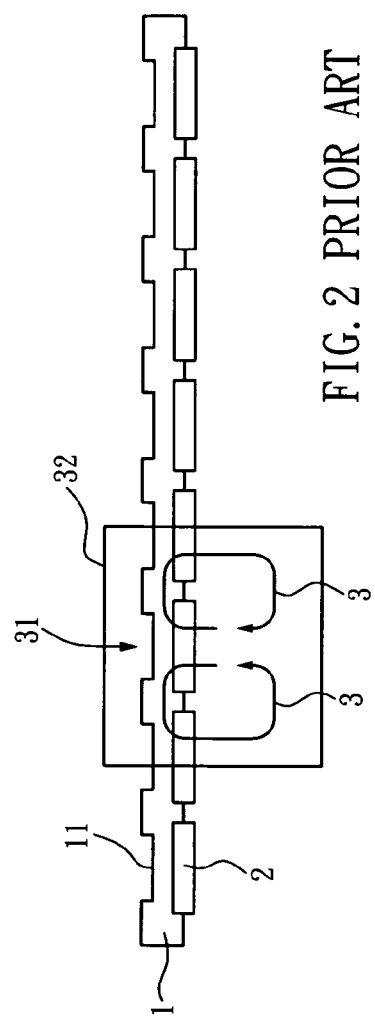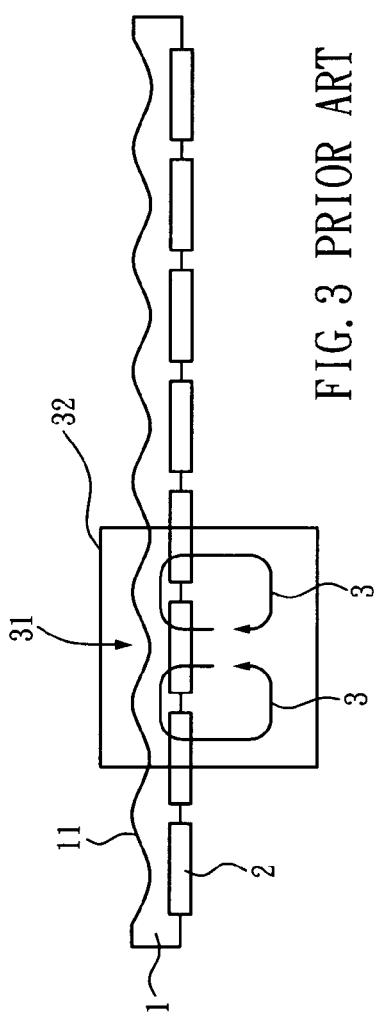

MAGNET YOKE OF LINEAR MOTOR

BACKGROUND OF THE INVENTION

1. Technical Field

The present invention relates to linear motors, and more particularly, to a magnet yoke of a linear motor that prevents magnetic flux from excessive saturation for such excessive saturation may counteract magnetic flux at two polarities of a permanent magnet, so as to make a moderate magnetic flux distribution without affecting the output performance of a linear motor.

2. Description of Related Art

Please refer to FIG. 1 through FIG. 3 for a linear motor incorporating a magnet assembly disclosed in U.S. Pat. No. 7,291,953. Therein, a plurality of permanent magnets 2 is arranged in a row on a side surface of a magnet assembly 1 while a plurality of notches 11 are set in equidistance, or in a predetermined distance as described in aforesaid prior-art device, on another side surface of the magnet assembly 1. The center of each said notch is aligned with a corresponding said permanent magnet, and thus each pair of adjacent said permanent magnets 2 interacts with the magnet assembly 1 to generate a magnetic field distribution 3, forming an empty zone 31. The adjacent two empty zones 31 spaced by an interval equal to the interval between each pair of the permanent magnets 2. As such magnetic field distribution 3 passes through two polarities of each permanent magnet 2, it is divided into two circuits forming a magnetic field unit 32. The change of such magnetic field distribution 3 forms an inducing eddy current, which interacts with a shifting magnetic field so as to generate a thrust driving the linear motor to operate in linear motion.

Furthermore, such interval of the empty zone 31 is located in the center of each pair of said permanent magnets 2 and this results in high concentration, or specifically saying "excessive saturation", of magnetic field distribution 3 over the center of each pair of said permanent magnets 2. Such saturation cancels out the magnetic field distribution 3 flanking two ends of the permanent magnet 2 thereby causing the magnetic fields to distribute unevenly at the flanks of the permanent magnet 2 and in turn weakening the thrust to the linear motor.

Conventionally, the above-mentioned over saturation of the magnetic field distribution 3 would have been solved by using magnetic blocks to realize magnetic guidance.

SUMMARY OF THE INVENTION

The disadvantages of said prior-art device mainly contained in any known design of a magnet yoke of a linear motor include that the interval of each two empty zones in the magnetic field is exactly the interval of each two permanent magnets and that such interval of each two empty zones is located in the center of each permanent magnet, thus making the magnetic flux over the center of each permanent magnet become over-saturated, which results in its uneven distribution by eating up the magnetic flux generated at the flanks of two polarities of two adjacent permanent magnets, and further contributes to a decrease of the thrust to the linear motor.

The present invention provides a magnet yoke of a linear motor which has a plurality of recesses set in equidistance in one of its side surface formed with a plurality of peaks and valleys aligned alternately and a plurality of permanent magnets lined up abreast in equidistance in another side surface opposing to the recesses so as to make an interval between two permanent magnets with its center corresponding to that of one said peak or valley. The two adjacent permanent magnets form a magnet unit, which interacts with the magnet yoke and thereby generates a magnetic flux distribution, which forms an empty section. An interval between the empty sections is twice as wide as an interval between two adjacent said permanent magnets is. Each said empty section is located in the middle of the two adjacent said permanent magnets and makes the moderate distribution of the magnetic flux.

A primary objective of the present invention is to realize a moderate magnetic flux distribution by broadening the interval between the empty sections to be twice as wide as that the interval between two said permanent magnets is, without affecting the performance of the linear motor.

Another objective of the present invention is to prevent such magnetic flux from becoming over-saturated and cancel out the magnetic flux occurred at the flanks of two polarities of the permanent magnet by using of the principle of magnetic flux.

Another objective of the present invention is to set the empty section between the adjacent said permanent magnets so as to accomplish more even magnetic flux.

Another objective of the present invention is to configure the magnet yoke as applicable to a multiaxial platen of a linear motor. In the lightweight design of the linear motor reducing the mass of the magnet yoke, given that a thrust to the linear motor remains constant, such design will enhance the acceleration of the linear motor. When the multiaxial platen has an axis fixed, additional two axes thereof are enabled to work with high efficiency without the need to increase output power at the additional two axes.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of an illustrative embodiment when read in conjunction with the accompanying drawings, wherein:

FIG. 1 shows a magnetic field distribution of a first known prior-art device;

FIG. 2 shows a magnetic field distribution of a second known prior-art device;

FIG. 3 shows a magnetic field distribution of a third known prior-art device;

DETAILED DESCRIPTION OF THE PREFERRED EMBODIMENT

Figure 4:
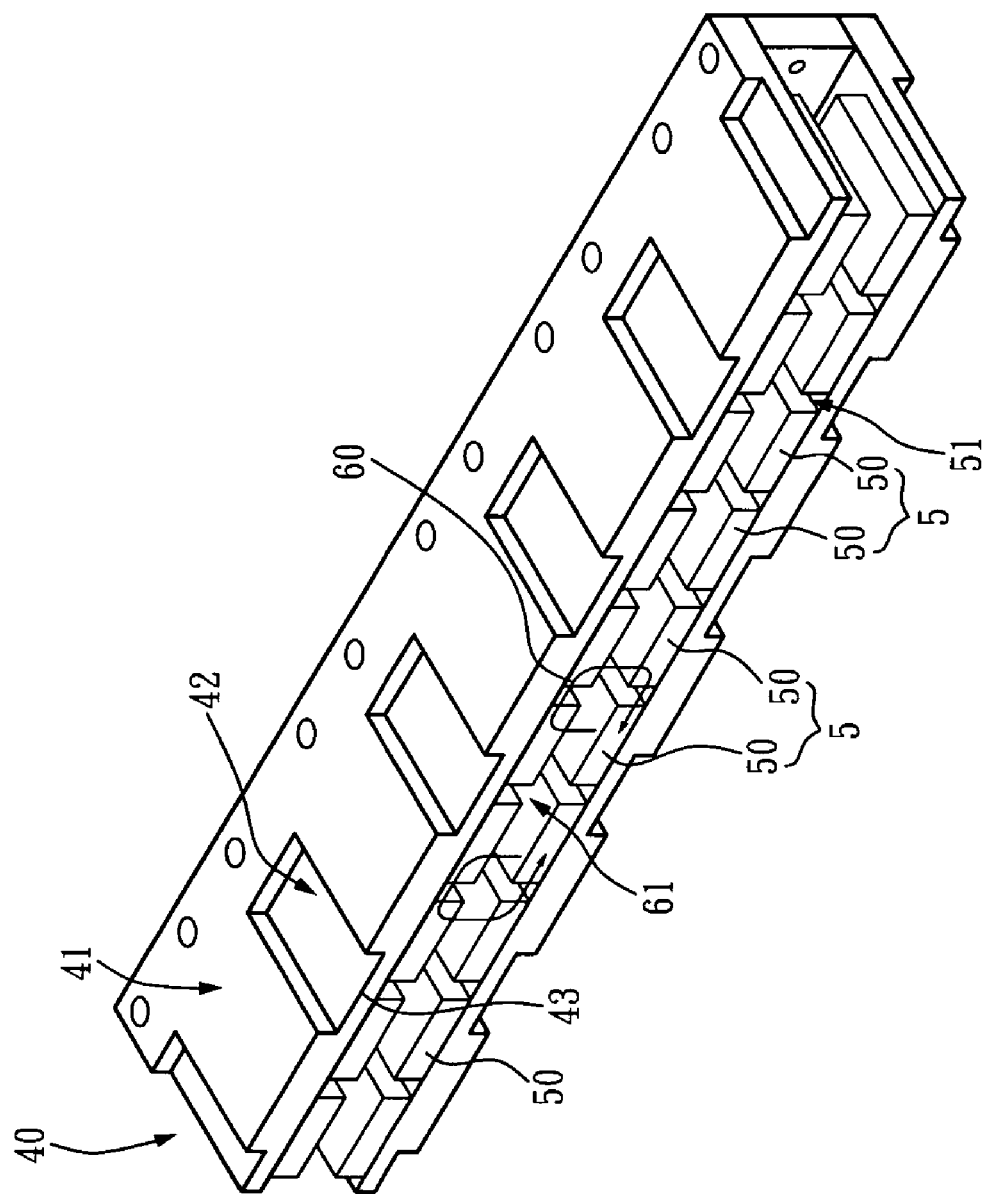
FIG. 4 is a perspective view of the present invention.
Figure 5:
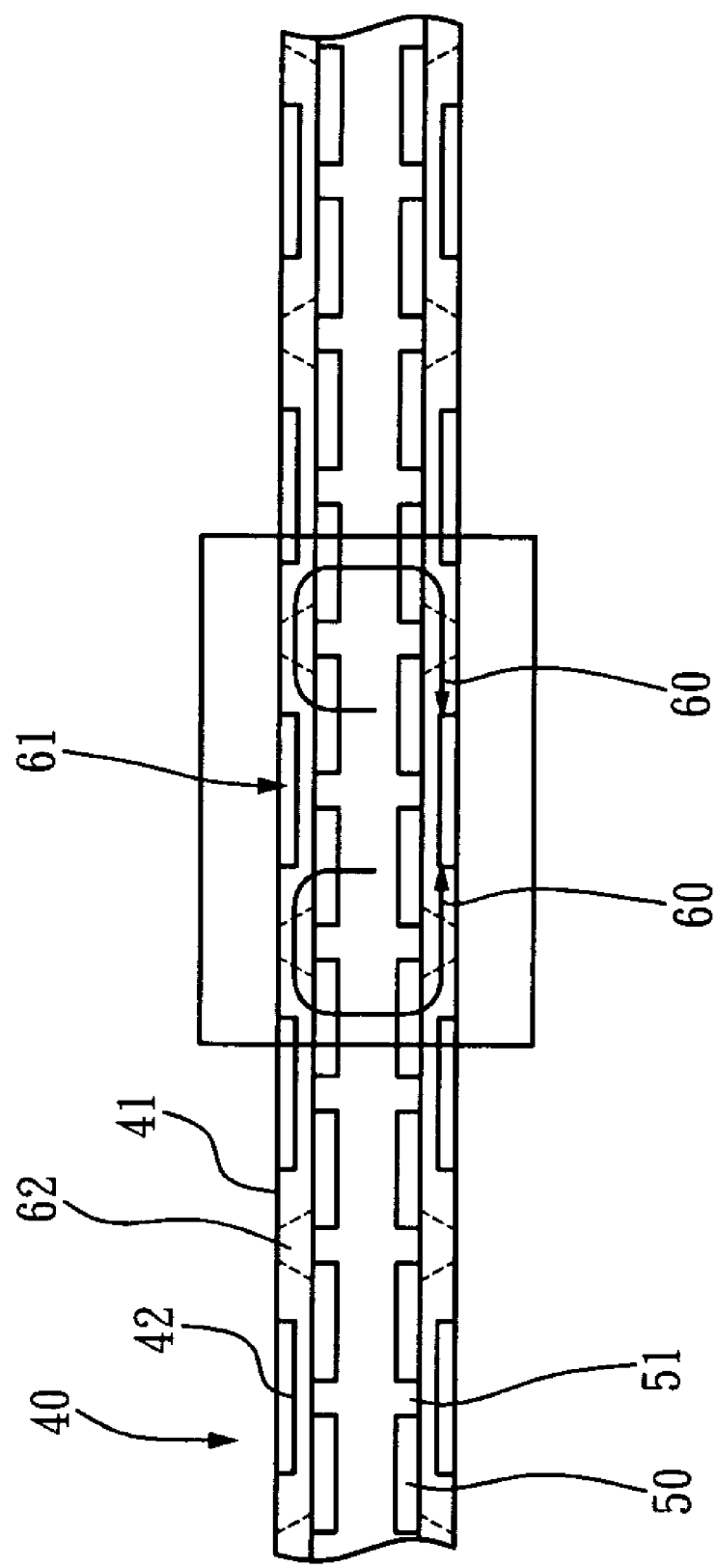
FIG. 5 is a schematic drawing depicting magnetic flux distribution of the present invention.

As shown in FIG. 4 and FIG. 5, the present invention involves a magnet yoke of a linear motor consisting of a magnet yoke 40 and a plurality of permanent magnets 50.

The magnet yoke 40 is a platen made of magnetically conductive material with a side surface where a plurality of recesses 43 is set in equidistance so that the side surface is shaped into an uneven surface defining a plurality of peaks 41 and a plurality of valleys 42 that are alternately aligned. The thickness of the peaks 41 is greater than the depth of the valleys 42. Such peaks 41 and valleys 42 may be arranged in the shape of a triangular wave, a square wave, a sinusoidal wave or other applicable shape.

The permanent magnets 50 are such settled in equidistance on another side surface of the magnet yoke 40 opposing to the recess 43 that their polarities are alternately arranged. Two adjacent said permanent magnets 50 are spaced by an interval 51. The center of the interval 51 is aligned with the center of a corresponding said peak 41 or valley 42. Each pair of adjacent permanent magnets 50 forms a magnet unit 5 for generating a magnetic flux distribution 60. An empty section 61 is thus created above a respective said valley 42. The empty sections 61 are spaced by an interval that is twice as wide as the interval 51 between two adjacent said permanent magnets 50 is, and located right between two adjacent said permanent magnets 50, and, between two adjacent said magnet units 5.

Above description is about the structural features of the present invention; the following context illustrates the magnetic flux distribution 60 under such structural features.

As shown in FIG. 5, as a current passes through a conductive armature coil (not shown) positioned in a magnetic field, it creates a magnetic flux distribution 60 which has changed and formed an inducing eddy current; such inducing current interacts with a generated shifting magnetic field so as to produce a thrust driving a linear motor to operate in linear motion. While any known principle of magnetic flux may be adopted for realizing the present invention, and such principles are familiar to people skilled in the art, no further detailed description about how the magnetic flux contributes to the movement of a linear motor will be given herein.

The magnetic flux distribution 60 located right between each pair of adjacent said permanent magnets 50, contained in each magnet unit 5, presents a high magnetic flux density section 62 where will not be emptied because it is a concentration of magnetic flux 60 and reaches a level of saturation. To empty such saturation, the present invention sets an empty section 61 between two adjacent magnet units and thereby makes the interval between the empty sections twice as wide as that between the pair of adjacent permanents. In comparison with the prior-art device by referring to FIG. 1 through FIG. 3 and the present invention by referring to FIG. 4 and FIG. 5, the present invention widens the interval between the empty sections 61 and locates the empty section 61 right between two adjacent said permanent magnets rather than sets it directly above each said permanent magnet 2 as indicated in the prior art, thereby solving the issue of canceling out the magnetic fields 3 occurred at the flanks of two polarities of each pair of adjacent said permanent magnets 2 due to the excessive saturation of such magnetic field 31 in the prior-art device, and making the magnetic flux distribution 60 more even.

In addition to that, by taking use of the magnetic flux distribution 60, the present invention can realize the goals of making a reduction in mass of the magnet yoke 40 and attaining the light weight of a linear motor without affecting the output performance of the linear motor. When applying to a multiaxial platen, given the thrust to the linear motor remains constant, the present invention will thereby enhance the acceleration of such linear motor. In the meanwhile, when an axis of the linear motor is fixed, the other two axes need no addition of output power to exert a better efficiency.

Having the embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention rather than limit the scope of the present invention. Accordingly, the foregoing description and drawings are by way of example only.

What is claimed is:

1. A magnet yoke of a linear motor, comprising:
   a plurality of recesses set in equidistance on a side surface of the magnet yoke and defining a plurality of peaks and valleys arranged alternately on the side surface of the magnet yoke, wherein a thickness of the peaks is greater than a depth of the valleys;
   a plurality of permanent magnets set in equidistance on an opposite side surface of the magnet yoke, wherein two adjacent said permanent magnets are spaced by an interval therebetween and a center of the interval is aligned with a corresponding said peak or valley; and
   a magnet unit consisting of two adjacent said permanent magnets for generating a magnetic flux distribution,
   whereby an empty section of the magnetic flux distribution is formed in one said valley, wherein an interval between two adjacent empty sections is twice as wide as the interval between of two adjacent said permanent magnets and is located right in a middle of two adjacent said permanent magnets so as to make the magnetic flux distribution moderate and wherein a center of an interval between two adjacent said magnet units is aligned to a center of a corresponding said valley.

2. The magnet yoke of claim 1 wherein the magnet yoke is a platen made of magnetically conductive material.

3. The magnet yoke of claim 1 wherein a plurality of permanent magnets is such settled that polarities of the permanent magnets are alternately arranged.

4. The magnet yoke of claim 1 wherein a high concentration of the magnetic flux exists between two adjacent said permanent magnets that form the magnet unit.

5. The magnet yoke of claim 1 wherein the peaks and valleys are arranged into a triangular waveform in shape.

6. The magnet yoke of claim 1 wherein the peaks and valleys are arranged into a square waveform in shape.

7. The magnet yoke of claim 1 wherein the peaks and valleys are arranged into a sinusoidal waveform in shape.

8. A magnet yoke of a linear motor, comprising:
   a plurality of recesses set in equidistance on a side surface of the magnet yoke and defining a plurality of peaks and valleys arranged alternately on the side surface of the magnet yoke, wherein a thickness of the peaks is greater than a depth of the valleys;
   a plurality of permanent magnets set in equidistance on an opposite side surface of the magnet yoke, wherein two adjacent said permanent magnets are spaced by an interval therebetween and a center of the interval is aligned with a corresponding said peak or valley; and
   a magnet unit consisting of two adjacent said permanent magnets for generating a magnetic flux distribution,
   whereby an empty section of the magnetic flux distribution is formed in one said valley, wherein an interval between two adjacent empty sections is twice as wide as the interval between of two adjacent said permanent magnets and is located right in a middle of two adjacent said permanent magnets so as to make the magnetic flux distribution moderate, and wherein an empty section is located between two adjacent said magnet units.

* * * * *